US010226965B1

United States Patent
Schwalbe et al.

(10) Patent No.: US 10,226,965 B1
(45) Date of Patent: Mar. 12, 2019

(54) SLIDER TO FRAME CONSTRUCTION

(71) Applicant: CNH Industrial America LLC, New Holland, PA (US)

(72) Inventors: Blaine A. Schwalbe, Valders, WI (US); Brian Pilney, West Bend, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/815,122

(22) Filed: Nov. 16, 2017

(51) Int. Cl.
  *B60B 35/10* (2006.01)
  *B62D 49/06* (2006.01)

(52) U.S. Cl.
  CPC ........ *B60B 35/109* (2013.01); *B60B 35/1036* (2013.01); *B62D 49/0678* (2013.01); *B60B 2900/1212* (2013.01); *B60Y 2200/224* (2013.01)

(58) Field of Classification Search
  CPC ..... A01B 63/006; A01B 63/16; A01B 63/163; A01B 63/166; A01B 63/22; B60B 35/10; B60B 35/1036; B60B 35/1072; B60B 35/109; B60B 2900/1212; A01M 7/0082; B60P 3/30; A01C 23/008; B62D 49/0678; B60Y 2200/224
  See application file for complete search history.

(56) References Cited

U.S. PATENT DOCUMENTS

| 3,964,565 | A | * | 6/1976 | Cagle .................. A01M 7/0082 180/21 |
| 4,040,643 | A | * | 8/1977 | Applequist ............ A01D 90/12 180/906 |
| 4,759,452 | A |   | 7/1988 | Faint et al. |
| 5,039,129 | A | * | 8/1991 | Balmer .................... B60G 3/04 180/209 |
| 5,063,728 | A |   | 11/1991 | Garter et al. |
| 5,464,243 | A |   | 11/1995 | Maiwald et al. |
| 5,488,996 | A |   | 2/1996 | Barry et al. |
| 6,119,882 | A |   | 9/2000 | Crook et al. |
| 6,199,769 | B1 | * | 3/2001 | Weddle .............. B60G 17/0416 180/906 |
| 8,042,817 | B2 | * | 10/2011 | Motebennur ............ B60G 9/00 280/5.514 |
| 8,091,799 | B2 |   | 1/2012 | Honermann et al. |
| 8,376,078 | B2 | * | 2/2013 | Hiddema .............. A01C 23/008 180/209 |
| 8,573,846 | B2 | * | 11/2013 | Mackin ............... B60B 35/1027 180/906 |
| 8,801,354 | B2 |   | 8/2014 | Lettau |
| 9,241,450 | B2 | * | 1/2016 | Mangen ................. A01G 25/09 |

(Continued)

*Primary Examiner* — Darren W Gorman

(74) *Attorney, Agent, or Firm* — Rebecca L. Henkel; Rickard K. DeMillie

(57) ABSTRACT

An agricultural machine such as a high clearance sprayer is provided with a frame capable of supporting wheels at a variable tread width. The frame includes a pair of cross members, both of which have slider receivers. The machine also includes a first axle slider for a first side and a second axle slider for a second side. The machine may also have a slider to frame connection arrangement that includes a reduced friction zone at the slider receivers that facilitate telescopic movement of the axle sliders. The slider to frame connection may also have at least one fixed slider wear pad in a fixed position within the reduced friction zone and at least one movable slider wear pad movably arranged within the reduced friction zone.

19 Claims, 8 Drawing Sheets

(56) References Cited

U.S. PATENT DOCUMENTS

2015/0102586 A1* 4/2015 Tollefsrud .......... B62D 49/0678
                                                           280/638
2015/0291233 A1* 10/2015 Dames ............... B62D 49/0678
                                                           280/638

* cited by examiner

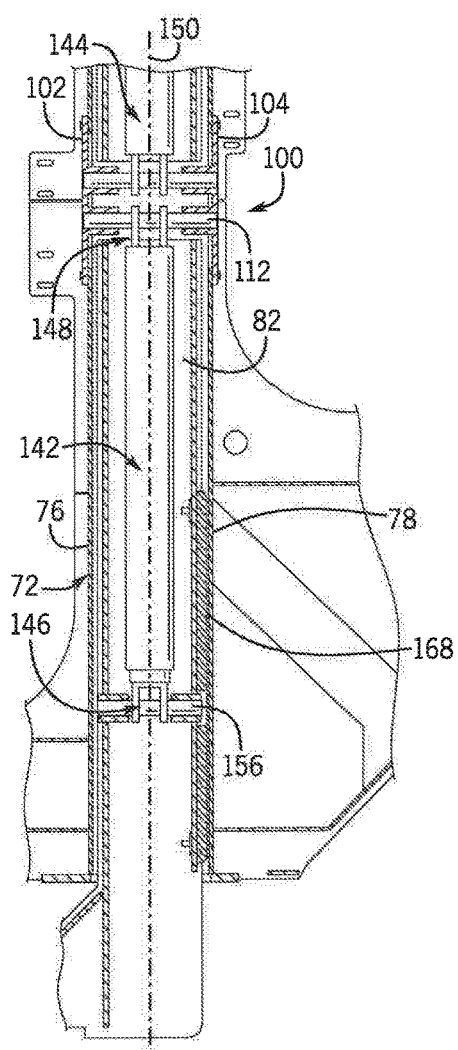
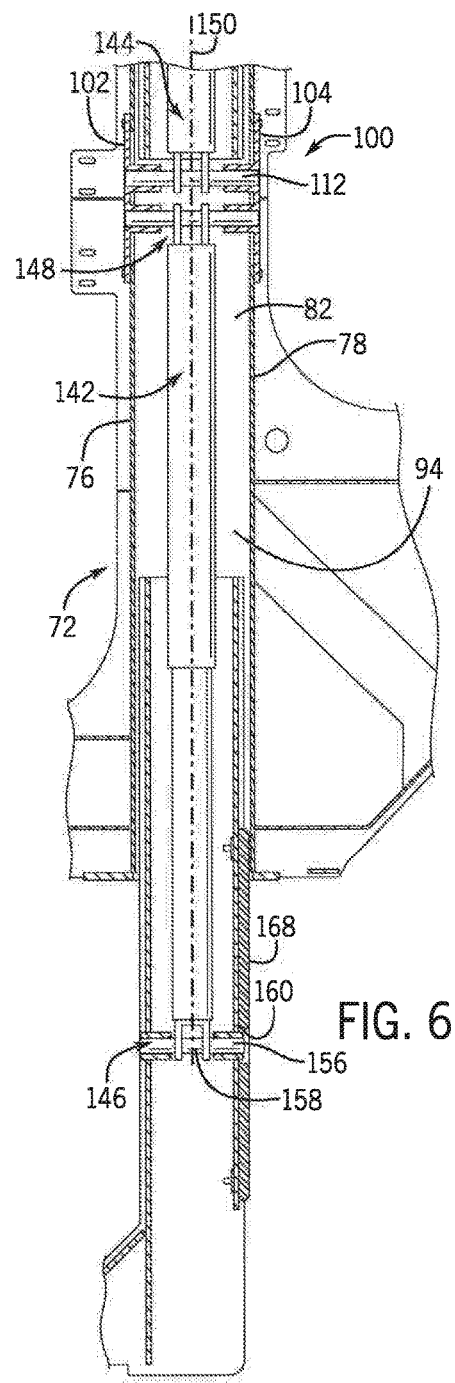
FIG. 5
FIG. 6

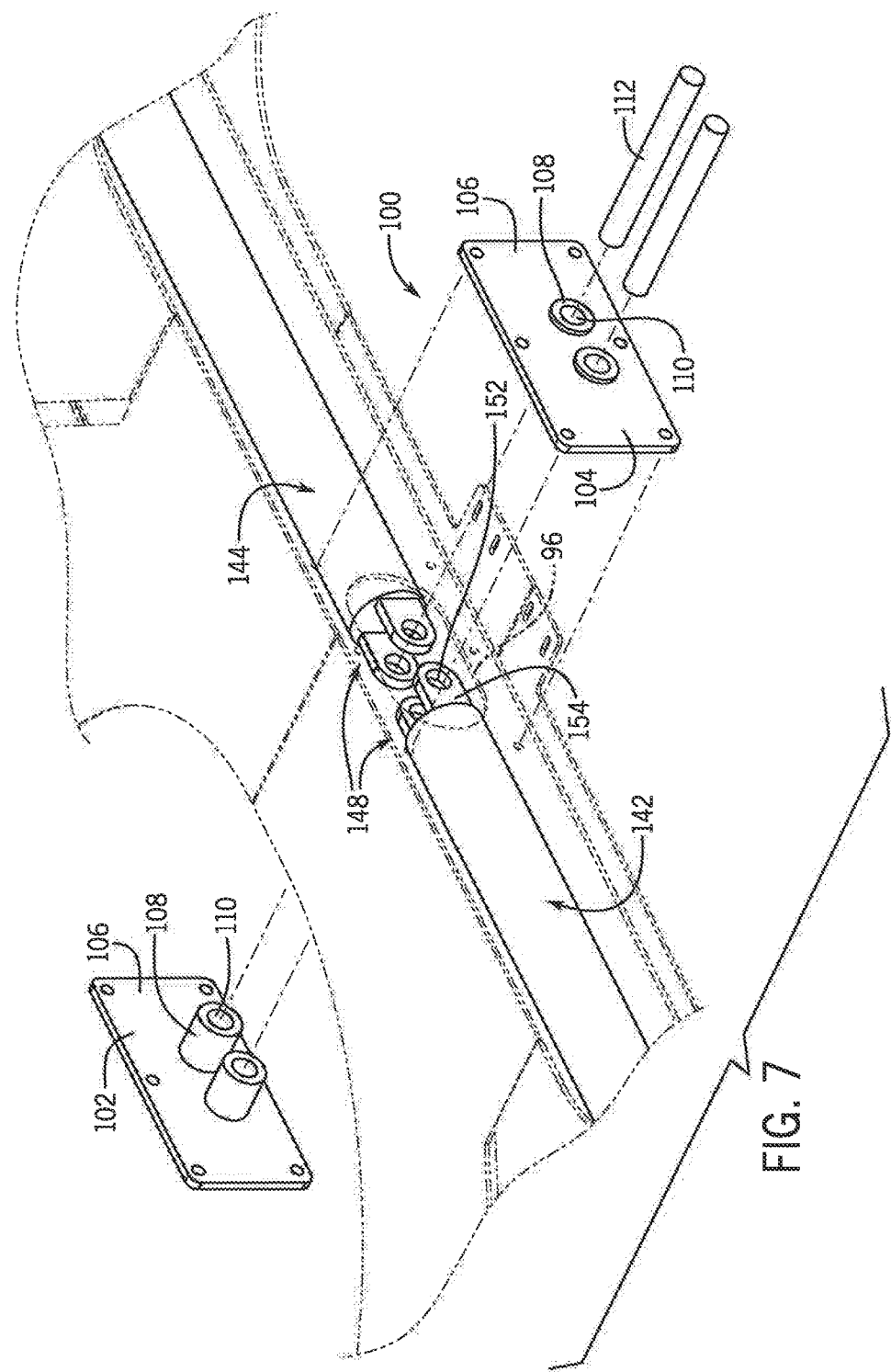

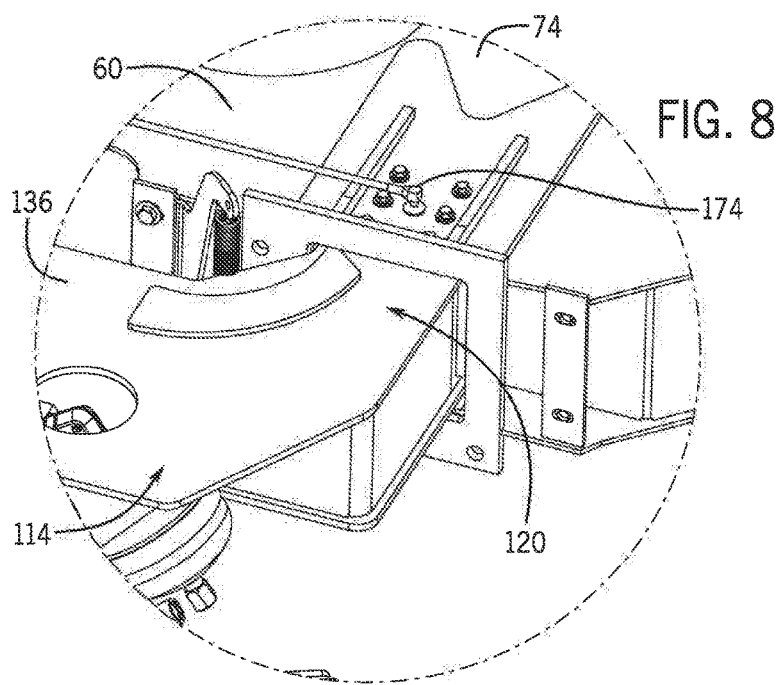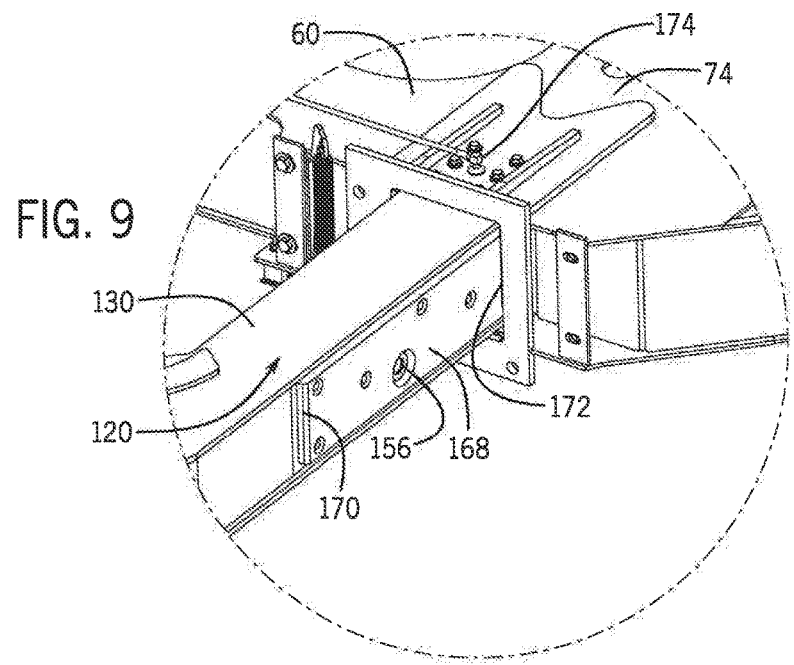

SLIDER TO FRAME CONSTRUCTION

FIELD OF THE INVENTION

The invention relates generally to agricultural product application equipment or agricultural machines such as self-propelled sprayers and, in particular, wear pads associated with slider legs that telescopically slide into and out of cross-members of a frame, where the slider pads improve sliding characteristics and reduce friction between the slider legs and the frame.

BACKGROUND OF THE INVENTION

Some high-clearance sprayers have axle sliders for mounting swingarms and axle-supporting legs to a chassis frame. The axle sliders can be removed from the frames to allow for collapsing and shipping the sprayers and for adjusting track width on sprayers with leg widening capabilities. To improve sliding characteristics between the axle sliders and the frame, wear slider pads made from low-friction materials have been provided at slider-to-frame sliding engagement interfaces. Currently, large slider wear pads are attached to both the top and bottom surfaces of each axle slider leg. Small strip-like slider wear pads are arranged against inwardly-facing surfaces of outer ends of the frame slider receivers, which provide wear material at the openings of the frame slider receivers. At the front slider receivers, the small strip-like slider wear pads collectively extend about and line the entire outer opening with some of the strip-like slider wear pads being shimmed. At the back of the slider receivers, the small strip-like slider wear pads are arranged at top and bottom inwardly-facing surfaces. Pad retainers are secured to the outer ends of the front and back frame slider receivers to hold the small strip-like slider wear pads in the frame slider receivers. Such a system has a lot of components that correspondingly require multiple steps to assemble and maintain. On machines with leg widening capabilities, each frame slider receiver has four grease fittings at front, rear, top, and bottom walls of frame slider receivers so there are sixteen grease points at the leg widening joints between the frame slider receivers and axle sliders.

SUMMARY OF THE INVENTION

An agricultural machine, such as a high clearance sprayer, having an adjustable track width with a frame a left axle slider, a right axle slider, and a slider to frame connection arrangement. The frame can have left and right sides with a pair of first and second cross members extending transversely therebetween. Outer segments of the first and second cross member may define a pair of left slider receivers and a pair of right slider receivers. The left slider receivers may also comprise a first slider receiver and a third axle receiver. The pair of left slider receivers are located towards the left side of the frame. Each of the left slider receivers have a first generally tubular body defined by interconnected slider receiver walls with inwardly facing surfaces. The pair of right slider receivers are located towards the right side of the frame. The pair of right slider receivers may also comprise a second axle receiver and a fourth axle receiver. Additionally, the right slider receivers have a second generally tubular body defined by interconnected slider receiver walls with inwardly facing surfaces.

According to an aspect, the left axle slider or first tread width connector extends outwardly and beyond the left side of the frame to support a pair of left wheels of the agricultural machine. The left axle slider is movable relative to the left side. Additionally, the left axle slider may include a left main slider body and a pair of left slider legs. Similarly, the left axle slider may include a left main slider body with a first axle slider leg and a second axle slider leg. Each of the left slider legs have interconnected walls with outwardly left facing surfaces. Also, the right axle slider or second tread width connector extends outwardly and beyond the right side of the frame to support a pair of right wheels of the agricultural machine. The right axle slider is movable relative to the right side. The right axle slider includes a right main slider body and a pair of right slider legs. Alternatively, the right axle slider may include a right main slider body with a third axle slider leg and a fourth axle slider leg. Each of the right slider legs have interconnected slider leg walls with outwardly facing surfaces. The first axle slider leg may be configured to be telescopically inserted into the first slider receiver. The second axle slider leg may be configured to be telescopically inserted into the third slider receiver. The third axle slider leg may be configured to be telescopically inserted into the second slider receiver. The fourth axle slider leg may be configured to be telescopically inserted into the fourth slider receiver.

According to yet another aspect, the slider to frame connection arrangement may be defined between the left slider receiver and the left axle sliders, and the right slider receiver and the right axle sliders. Alternatively, the slider to frame connection could similarly be defined between the left axle slider, the right axle slider, the first cross member, and the second cross member. The slider to frame connection includes a reduced friction zone that is defined at outer ends of each of the pairs of left and right slide receivers. This reduced friction zone facilitates telescopic movement of the respective pairs of left and right slider legs inside of the pairs of left and right slider receivers. Further, the slider to frame connection arrangement includes at least one fixed slider wear pad and at least one movable slider wear pad. The fixed slider wear pad may be held in a fixed position within the reduced friction zone. The movable slider wear pad may be movably arranged within the reduced friction zone during telescopic movement of the respective pairs of the left and right slider legs inside of the pairs of the left and right slider receivers. All of the slider wear pads may be made of a ultra-high molecular weight material.

According to another aspect, the at least one fixed slider wear pad may define a slider receiver wear pad that is mounted to at least one of the inwardly facing surfaces of the slider receiver walls. The at least one fixed slider wear pad may be a horizontal fixed slider wear pad. The at least one fixed slider wear pad could also be mounted to an inwardly facing opposite surface of one of the cross members. Additionally, the at least one fixed slider wear pad may define a pair of slider receiver wear pads that are mounted to a pair of the inwardly facing surfaces of the slider receiver walls. For instance, the pair of slider receiver wear pads may be mounted to a pair of oppositely facing surfaces of the inwardly facing surfaces of the slider receiver walls. More specifically, the pair of slider receiver wear pads may by mounted to inwardly facing surfaces of the slider receiver walls that define a top wall and a bottom wall of the slider receiver walls.

According to yet another aspect, the at least one movable slider wear pads may define at least one slider leg wear pad that is mounted to at least one of the outwardly facing surfaces of the slider leg walls. The at least one movable slider wear pad may be a vertical slider movable wear pad.

Also, the at least one movable slider wear pad may be defined by a pair of slider leg wear pads that are mounted to a pair of the outwardly facing surfaces of the slider leg walls so that the slider wear pads move in unison with the respective slider legs. Further, on each of the left and right axle sliders, the pair of slider leg wear pads includes a first slider leg wear pad mounted to a first slider leg and a second slider leg wear pad mounted to a second slider leg. Further still, the first and second slider leg wear pads may face away from each other, with the first slider leg wear pad mounted to a forward-facing surface of a first slider leg and the second slider leg wear pad is mounted to a rearward-facing surface of a second slider leg. Furthermore, the movable slider wear pad may have a substantially larger surface area than the surface area of the at least one fixed slider wear pad.

In accordance with another aspect, the first slider receiver, the second slider receiver, the third slider receiver, and the fourth slider receiver have a first grease fitting formed in a top wall and a second grease fitting formed in a bottom wall.

In accordance with yet another aspect, each of the first axle slider leg, the second axle slider leg, the third axle slider leg, and the fourth axle slider leg further comprise a top plate, a bottom plate, and a side plate. The top plate may have an outwardly facing first edge and the bottom plate may have an outwardly facing second edge. The side plate extends between the top plate and the bottom plate. Additionally, the side plate may be offset from the first edge and the second edge to form a lip. The at least one movable slider wear pad may thereafter be secured within the lip.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 5 is a cross sectional side elevation view of the frame in the first position, taken generally along line 5-5 of FIG. 3 showing the interior of a cross member;

FIG. 6 is a cross sectional side elevation view of the frame in the second position, taken generally along line 6-6 of FIG. 4 showing the interior of the cross member;

FIG. 7 is an exploded isometric view of the cross member and two mounting plates used to secure a pair of actuators to the chassis frame;

FIG. 8 is detailed isometric view of an axle slider and a portion of the chassis frame in the first position of FIGS. 3 and 5, taken generally along line 8-8 of FIG. 2;

FIG. 9 is a detailed isometric view of the axle slider and a portion of the chassis frame in the second position of FIGS. 4 and 6;

DETAILED DESCRIPTION OF THE PREFERRED EMBODIMENTS

Figure 1:
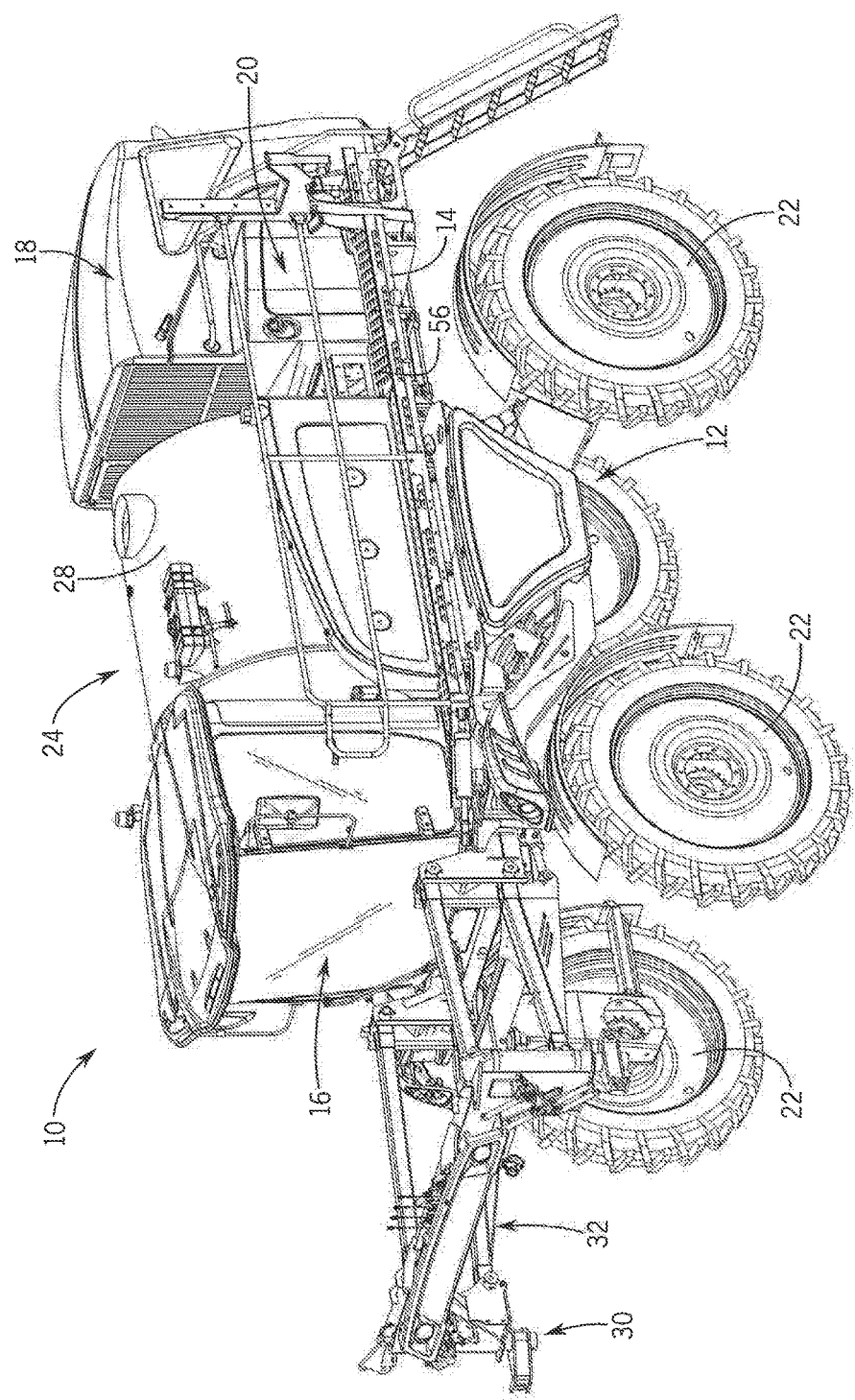
FIG. 1 is an isometric view of an agricultural machine.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings.

A spray system 24 can include storage containers such as a rinse tank 26 for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Figure 2:
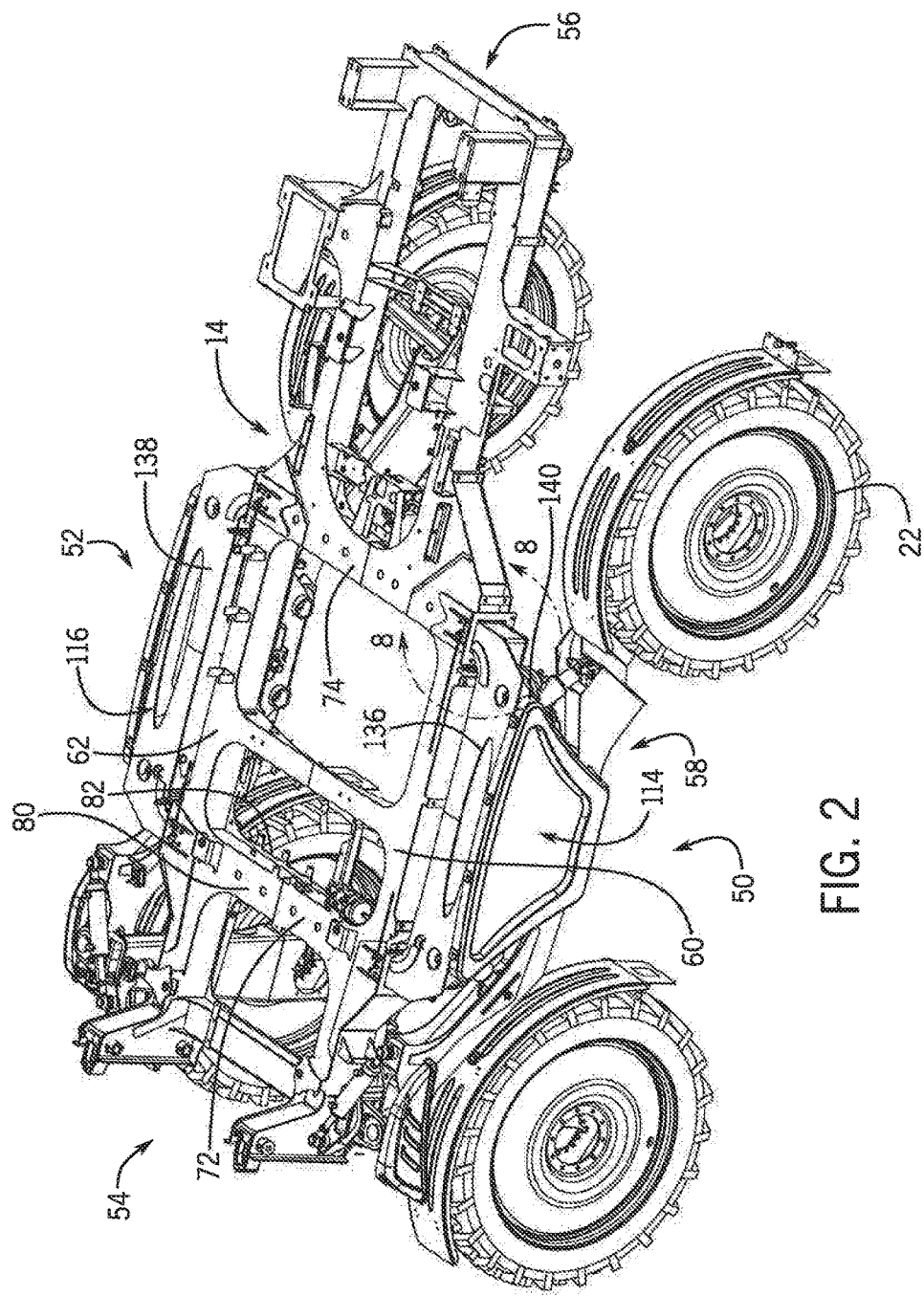
FIG. 2 is an isometric view of a chassis frame of the agricultural machine of FIG. 1.

The chassis frame 14 and various other components associated with the chassis frame 14 that facilitate tread width adjustments or that allow for shipping of various components associated with the sprayer 10 will be described in greater detail. The chassis frame 14, as most clearly shown in FIG. 2-4 includes a first side 50, a second side 52, a front end 54, a back end 56, and a central portion 58. The first side 50 includes a first frame side-rail 60 within the central portion 58 and the second side 52 includes a second frame side-rail 62 within the central portion 58. Each the frame side-rails 60, 62 are generally tubular in shape with a top wall 64, a bottom wall 66, a first side wall 68, and a second side wall 70.

Additionally, the chassis frame 14 includes a first cross member 72 that extends from the first side-rail 60 to the second side-rail 62 at the front of the central portion 58 and a second cross member 74 that extends from the first side-rail 60 to the second side-rail 62 at the rear of the central portion 58. Each of the cross members 72, 74 have a generally tubular body defined by interconnected slider receiver walls with inwardly-facing surfaces, for instance, front and rear walls 76, 78 respectively, and top and bottom walls 80, 82 respectively. As such, the cross members 72, 74 are substantially hollow, which allows various components to be routed within each cross member 72, 74 and for components to slide into and out of each cross member 72, 74.

Figure 11:
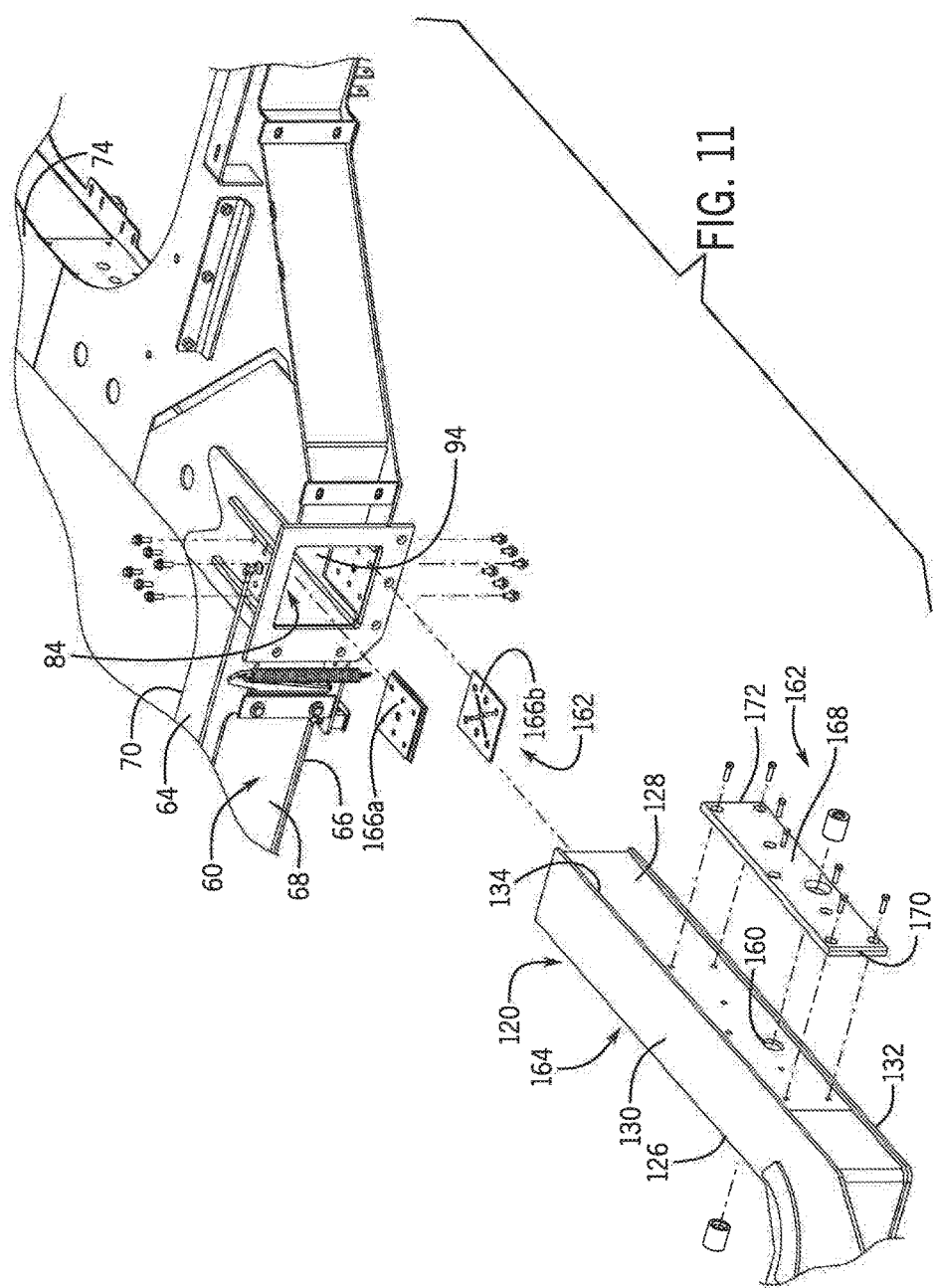
FIG. 11 is an exploded isometric view of the first axle slider and the frame.

The cross members 72, 74 may also have openings 84 located at outer ends of either frame side-rail 60, 62 that form slider receivers 86, 88, 90, 92. While only one opening 84 is shown in FIG. 11, it should be understood that similar openings are formed in each of the outer ends of the frame side-rails 60, 62 adjacent to the cross members 72, 74. As shown, a first slider receiver 86 may be located at the first frame side-rail 60 and a second slider receiver 88 may be located at the second frame side-rail 62 of the first cross member 72. A third frame slider receiver 90 may similarly be located at the first frame side-rail 60 and a fourth frame slider receiver 92 may be located at the second frame side-rail 62 of the second cross member 74. As such, the first slider receiver 86 and the third slider receiver 90 may constitute a pair of left slider receivers and the second slider receiver 88 and the fourth slider receiver 92 may constitute a pair of right slider receivers. The cross members 72, 74 may also form slider passages 94 directly adjacent to the slide receivers 86, 88, 90, 92 in both the first cross member 72 and the second cross member 74. These frame slider receivers 86, 88, 90, 92 and slider passages 94 are configured to accommodate slider legs, which will be further described below.

Further, the cross members 72, 74 may feature openings 96 formed in the front and rear walls 76, 78 to facilitate access to the interior of the cross members 72, 74. While only a first opening 96 is shown in FIG. 7, a second opening, a third opening, and a fourth opening are similarly formed in the cross members 72, 74 as described below. For instance, the first opening 96 may be formed in the front wall 76 of the first cross member 72 and the second opening may be formed in a rear wall 78 of the first cross member 72. Similarly, the third opening may be formed in the front wall 76 of the second cross member 74 and the fourth opening may be formed in the rear wall 78 of the second cross member 74. These openings 96 enable maintenance procedures on parts that may be routed through the cross members 72, 74. Preferably, these openings 96 are formed along the longitudinal axis of the sprayer 10. This is especially helpful because many of the components routed through the cross members 72, 74 are mounted to the center of the agricultural machine 10.

When the sprayer 10 is in use, however, a tread width connection assembly 100 may be used to close up the openings 96 to protect the contents housed within the cross member 72, 74. For instance, the tread width connection assembly 100 may include four mounting plates that correspond with the four openings 96 formed in the front and the rear walls 76, 78 of the cross member 72, 74. Still looking to FIG. 7, while the mounting plates 102, 104 are only shown with the second cross member 74, identical mounting plates are similarly mounted to the first cross member 72. More specifically, a first mounting plate may be mounted to the front wall 76 of the first cross member 72 to cover the first opening and a second mounting plate may be mounted to the rear wall 78 of the first cross member 72 to cover the second opening. Similarly, a third mounting plate 102 may be mounted to the front wall 76 of the second cross member 74 to cover the third opening and a fourth mounting plate 104 may be mounted to the rear wall 78 of the second cross member 74 to cover the fourth opening 96.

Each of the mounting plates 102, 104 include a generally flat body 106 with at least one collar 108 extending outwardly therefrom with an opening 110 formed therein. As shown in FIG. 7, each of the mounting plates 102, 104 have two circular collars 108, where each of the two circular collars 108 coincide with one of two actuators described below that are routed through the cross members 72, 74. Each collar 108 is configured to be inserted into the openings 96 formed in the cross members 72, 74. In this way, the collars 108 help to locate the mounting plates 102, 104 relative to the opening 96 formed in the cross members 72, 74 to ensure a secure fit. The mounting plates 102, 104 are secured to the chassis frame 14 using bolts, screws, or other fasteners that are inserted through the mounting plates 102, 104 and into the front wall 76 and rear wall 78. Additionally, at least one pin 112 and as shown two pins may be inserted through the openings 110 in the mounting plates 102, 104 as well as the respective cross member 72, 74. The pins 112 may also be configured to extend through components located within the respective cross member, as will further be described below. Additionally, these collars 108 provide added surface area to improve the structural connection between the mounting plates 102, 104, the cross members 72, 74, and the components located within the cross members 72, 74.

The mounting plates 102, 104 therefore define a mounted position and an unmounted position. In the mounted position, the mounting plates 102, 104 are connected to the respective frame cross member 72, 74. This allows the openings 96 to be covered to prevent access to components mounted within the cross members, such as actuators that will further be described below, as well as any other components that may be mounted within the cross members 72, 74. In the unmounted position, the mounting plates 102, 104 are removed from the respective frame cross member 72, 74. This allows the interior of the frame cross members 72, 74 to be uncovered, which allows for access to the components routed within the cross members 72, 74. Such access allows for maintenance of components within the cross members 72, 74.

Next, axle slider assemblies 114, 116 will be further described, which extend outwardly and beyond the first side 50 and the second side 52 of the chassis frame 14, and are movable relative to the chassis frame 14 and support the sprayer 10 wheels 22. The sprayer 10 includes two axle slider assemblies, with a first axle slider 114 being movably adjusted relative to the first side 50 and a second axle slider 116 being movably adjusted relative to the second side 52. Preferably, the axle sliders 114, 116 will both move the same distance once actuated, such that the chassis frame 14 is always centered relative to the two axle sliders 114, 116.

Each of the axle sliders 114, 116 include axle slider legs, a main slider body, and a pair of swing arms. More specifically, the first axle slider 114 includes a first axle slider leg 118 that may be telescopically inserted into the first slider receiver 86. The first axle slider 114 also includes a second axle slider leg 120 that may be telescopically inserted into the third slider receiver 90. Similarly, the second axle slider 116 includes a third axle slider leg 122 that may be telescopically inserted into the second slider receiver 88. The second axle slider 116 also includes a fourth axle slider leg 124 that may be telescopically inserted into the fourth slider receiver 92. Each of the slider legs 118, 120, 122, 124 have interconnected slider leg walls having outwardly-facing surfaces, including front and rear walls 126, 128 respectively, and top and bottom walls 130, 132 respectively. While these walls are only shown in FIG. 11 with respect to the second axle slider leg 120, it should be noted that the remaining legs 118, 122, 124 have similar walls. Additionally, the front and/or rear wall 126, 128 may be slightly offset from outer edges of the top and bottom walls 130, 132, as best seen in FIG. 11. In this way, a lip 134 may be formed where the edges of the top and bottom walls 130, 132 extend beyond the front and/or rear wall 126, 128.

Additionally, the first axle slider 114 includes a main slider body 136 that extends parallel to the first side 50 of the chassis frame 14 from the first axle slider leg 118 to the second axle slider leg 120. Correspondingly, the second axle slider 116 includes a main slider body 138 that extends parallel to the second side 52 of the chassis frame 14 from the third axle slider leg 122 to the second axle slider leg 124. In this way, the second axle slider 116 is the inverse of the first axle slider 114. Further still, pairs of swingarms 140 extend from a front and rear segment of both main slider bodies 136, 138. Finally, a pair of wheels 22 are rotatably supported by each of the pair of swing arms 140.

To facilitate movement of the first axle slider 114 and the second axle slider 116, a plurality of actuators may be mounted within the first cross member 72 and the second cross member 74. While FIGS. 5-7 show a pair of actuators 142, 144 contained within the second cross member 72, it should be noted that an identical pair of actuators are also located within the first cross member 72 as will be described below. As shown, the plurality of actuators 142, 144 are substantially cylindrical actuators, where each cylindrical actuator 142, 144 includes a first end 146 and second end 148. Four actuators may be utilized that attach to the chassis frame 14 and one of the axle slider legs 118, 120, 122, 124. A first actuator may be mounted within the first cross member 72 at one end and to the first slider leg 118 at the other end and a third actuator 142 may be mounted within the second cross member 74 at the first end 146 and to the second slider leg 120 at the second end 148. As such, the first actuator and third actuator 142 may form a first side actuator pair for moving the first axle slider assembly 114 into or out of the chassis frame 14. Additionally, a second actuator may be mounted within the first cross member 72 at one end and to the third slider leg 122 at the other end and a fourth actuator 144 may be mounted within the second cross member 74 at one end 146 and to the fourth slider leg 124 at the other end 148. As such, the second actuator and fourth actuator 144 may form a second side actuator pair for moving the second axle slider assembly 116 into or out of the chassis frame 14.

It should also be noted that the actuators 142, 144 are preferably mounted such that each actuator 142, 144 is located substantially close to the center axis 150 of the cross member 72, 74, midway between the front wall 76 and the rear wall 78, and midway between the top wall 80 and the bottom wall 82. For instance, the first and second actuators may both run substantially parallel through a central axis extending through the first cross member 72. Stated differently, the first and second actuators may be substantially concentrically mounted within the first cross member 72. Similarly, the third and fourth actuators 142, 144 may also both run substantially parallel through a central axis 150 extending through the second cross member 74, as shown in FIGS. 5 and 6. The third and fourth actuators 142, 144 also may be substantially concentrically mounted within the second cross member 74. This is advantageous over similar systems found in the prior art where actuators were used but were not concentrically mounted within the respective cross member. More specifically, the concentric location of the actuators 142, 144 within the cross member 74 reduces the bending moment on the actuators 142, 144, as well as stress due to flex that is caused by having the actuators 142, 144 mounted away from the central axis of the cross member 74. Due to these reduced stresses and bending moments, the actuators 142, 144 can be smaller in size, which reduces the cost of the actuators 142, 144 as well as the amount of hydraulic fluid required for the actuators 142, 144 to function. Furthermore, the smaller sized actuators 142, 144 are easier to package and ship.

The plurality of actuators 142, 144 may be mounted on one end to the chassis frame 14 about the mounting plates 102, 104, as can best be seen in FIG. 7. More specifically, the pins 112 may be inserted through the first mounting plate 102, through openings 152 located in a yoke 154 of the actuator 142, 144 at the second end 148, and then through the second mounting plate 104. Therefore, the mounting plates 102, 104 and pins 112 mount the inner end of the actuator 142, 144 in place. Additionally, once the mounting plates 102, 104 are mounted to the chassis frame 14, the interior of the cross members 72, 74 may be isolated from the exterior of the cross member 72, 74. This helps to protect components within the cross members 72, 74, including the actuators 142, 144, from substances that are distributed from the sprayer 10, including chemicals, pesticides, and other liquids that could damage or reduce the efficiency of interior components, such as the actuators 142, 144. Additionally, when the mounting plates 102, 104 are removed in the unmounted position, the second end 148 of the actuators 142, 144 can be easily accessed for maintenance purposes.

Figure 3:
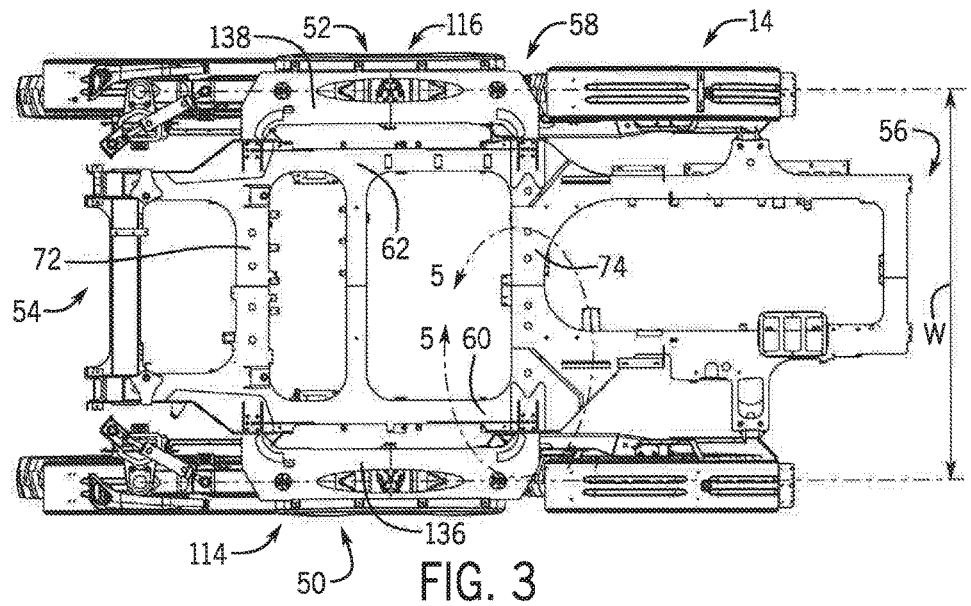
FIG. 3 is a top plan view of the frame of the agricultural machine of FIG. 1 in a first position with a first tread width wherein a first axle slider and a second axle slider are located directly adjacent to the chassis frame.
Figure 4:
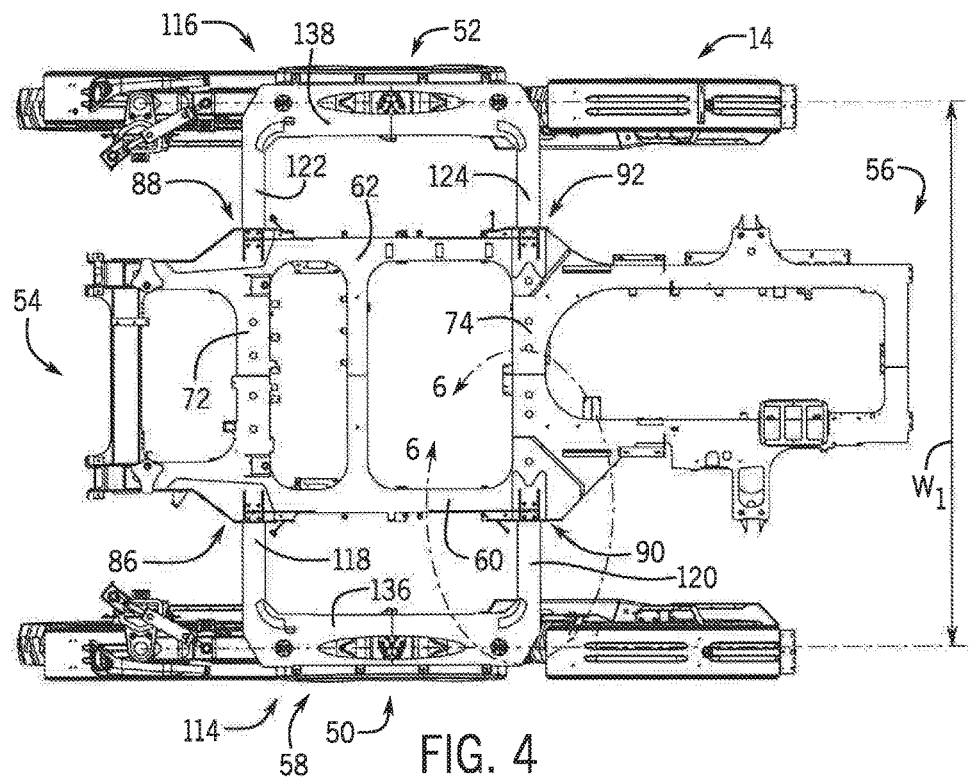
FIG. 4 is a top plan view of the frame of the agricultural machine of FIG. 1 in a second position with a second tread width wherein the first axle slider and the second axle slider are spaced apart from the chassis frame.
Figure 10:
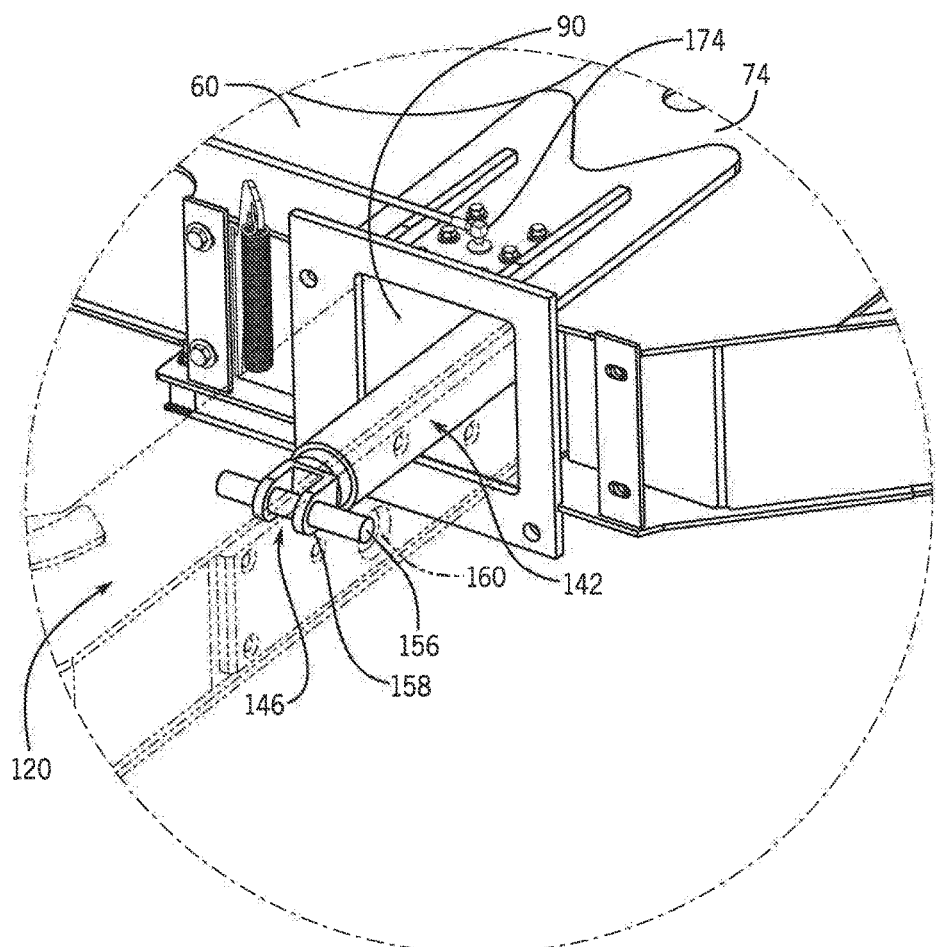
FIG. 10 is a detailed isometric view of the axle slider in phantom and a portion of the chassis frame showing the interior of the axle slider.

On the first end 146, the actuators 142, 144 are secured to the axle slider leg 118, 120, 122, 124, with one of the four actuators associated with one of the four axle slider legs. While FIG. 10 shows the connection between the third actuator 142 and the second axle slider leg 120, it should be noted that the other actuators could similarly be mounted to the other axle slider legs. Still looking to FIG. 10, the third actuator 142 may be secured within the second axle slider leg 120 with at least one pin 156 extending through an opening 158 formed in the first end 146 of the actuator 142 and an opening 160 formed in the second axle slider leg 120. As a result, when the actuators 142, 144 are actuated, the axle slider legs 118, 120, 122, 124 can be telescopically moved into or out of the respective cross member 72, 74. In turn, this results in telescopic movement of the first axle slider 114 and the second axle slider 116 into and out of the first cross member 72 and second cross member 74, which causes the overall width of the sprayer 10 to change. The overall width of the sprayer 10, and by extension the distance between the wheels 22 of the sprayer 10, can therefore be adjusted as desired. As seen in FIG. 3, the sprayer 10 is shown in a first minimum width W. The sprayer 10 can be expanded to a second maximum width W', as seen in FIG. 4. Of course, the sprayer 10 width could be adjusted to any width between width W and width W'. Further still, the sprayer 10 could be further extended beyond width W' in other embodiments. Again, preferably the actuators 142, 144 are synched such that they move an equal distance to ensure that the center of the sprayer 10 remains along the longitudinal axis.

Another aspect of the sprayer 10 relates to a slider to frame connection arrangement 162 that allows for movement between the pair of left slider receivers 86, 90 and the first axle slider 114 and the pair of right slider receivers 88, 92 and the second axle slider 116. This could be used for a sprayer 10 that is shipped with the chassis frame 14 separate from the axle sliders 114, 116, or where the sprayer 10 features a tread width adjustment feature. The frame connection arrangement 162 may include a reduced friction zone 164 that is defined at outer ends of the pair of left slider receivers 86, 90 and the pair of right slider receivers 88, 92. The reduced friction zone 164 helps facilitate the telescopic movement of the respective pairs of slider legs 118, 120, 122, 124 into and out of the pair of left slider receivers 86, 90 and the pair of right slider receivers 88, 92 described above while minimizing friction between the various components. For instance, a fixed slider wear pad 166 may be arranged in a fixed position within the reduced friction zone 164. Additionally, or in substitution to the fixed slider wear pad 166, a movable slider wear pad 168 may be movably arranged in the reduced friction zone 164. The movable slider wear pad 168 moves within the reduced friction zone 164 when the telescopic movement of the respective pairs of slider legs 118, 120, 122, 124 into and out of the pair of left slider receivers 86, 90 and the pair of right slider receivers 88, 92 described above.

The slider wear pads 166, 168 could be made of any material known to reduce friction between metallic components. For instance, the slider wear pads 166, 168 may be made of a material having an ultra-high molecular weight. Such materials may be made from recycled material. Each of the wear pads 166, 168 may be secured into place relative to the axle slider legs 118, 120, 122, 124 and/or slider receivers 86, 88, 90, 92 using bolts, screws, or other fasteners. Of course, multiple fixed slider wear pads 166 and multiple movable slider wear pads 168 could be used to further facilitate movement of the axle slider legs 118, 120, 122, 124 relative to the slider receivers 86, 88, 90, 92.

More specific configurations of slider wear pads 166, 168 will now be described. Although these slider wear pads 166, 168 will be described relative to the first axle slider assembly 114, it should be noted that similar configurations could be used with the second axle slider assembly 116 of the sprayer 10. Turning to FIG. 11, a pair of fixed slider wear pads 166a, 166b, may be associated with each slider receiver. As shown in the figures, the fixed slider wear pads 166a, 166b are mounted to opposite inwardly-facing surfaces of the slider receiver walls. More specifically, a first fixed slider wear pad 166a is mounted to the top wall 80 and a second fixed slider wear pad 166b is mounted to a bottom wall 82. Therefore, in this configuration the fixed slider wear pads 166a, 166b are all horizontally oriented. This would reduce friction between any of the top wall 80 and the bottom wall 82 of the second axle slider leg 120 as it is inserted into the third slider receiver 90. However, the fixed slider wear pads 166 could also be mounted to one or both of the front wall 76 and the rear wall 78, either in combination with the pair of pads 166a, 166b mounted to the top wall 80 and the bottom wall 82 or in isolation. Again, while only the third slider receiver 90 is shown, similar fixed slider pads 166 or pairs of fixed slider pads can be mounted within the first slider receiver 86, the second slider receiver 88, and the fourth slider receiver 92.

Turning to FIGS. 9 and 10, a single movable wear pad 168 is associated with each axle slider leg 118, 120, 122, 124, with a pair of movable wear pads associated with an entire axle slider 114, 116. More specifically, the movable wear pad 168 is mounted to a rearward-facing wall 128 of the second axle slider leg 120. For instance, the movable wear pad 168 may be mounted in the lip 134 formed by the offset of the front or rear wall 126, 128 and the top and bottom wall 130, 132 described above. The movable wear pad 168 therefor extends beyond the lip 134 to provide a wear pad surface that engages the rear wall 78 of the slider receiver 90. Another movable wear pad (not shown) is mounted to a forward-facing wall 126 of the first axle slider leg 118 associated with the first axle slider assembly 114. In this way, the movable wear pads 168 are vertically oriented. As such, this pair of movable wear pads 168 move in unison with respective first and second axle slider legs 118, 120. As stated above, additional movable wear pads 168 could also be mounted to any of the axle slider legs 118, 120, 122, 124, for instance on the opposite side of the axle slider legs 118, 120, 122, 124. Again, while only the third slider receiver 90 is shown, similar movable slider pads 168 or pairs of movable slider pads can be mounted about the first axle slider leg 118, the third axle slider leg 122, and the fourth axle slider leg 124.

Preferably, the configuration of fixed slider wear pads 166 and movable slider wear pads 168 reduces friction about multiple walls of the axle slider legs 118, 120, 122, 124 and the slider receivers 86, 88, 90, 92. For instance, as shown the slider-to-frame connection 162 protects top and bottom walls 80, 82, 130, 132 by the fixed wear pads 166, and protects front and rear walls 76, 78, 126, 128 using the movable wear pads 168. Additionally, as can be seen in the figures, the movable wear pads 168 may have a surface area greater than the surface area of the fixed wear pad 166. The additional surface area of the movable wear pad 168 accounts for the fact that the axle slider legs 118, 120, 122, 124 will be moving in and out of the slider receivers 86, 88, 90, 92. Therefore, the increased length of the movable wear pad 168 may reflect the travel path and length of the axle slider legs 118, 120, 122, 124 that move into and out of the slider receivers 86, 88, 90, 92. Stated differently, each movable wear pad 168 may have a first end 170 and a second end 172, where the first end 170 is substantially flush with the edge of the frame side rail 60 when the machine 10 is at its narrowest width, as seen for instance in FIG. 3. The second end 172 would be substantially flush with the edge of the frame side rail 60 when the machine 10 is at its widest width, as seen for instance in FIG. 4. In the way, when the sprayer 10 is at any operative width, the movable wear pad will be at least partially engaged between the axle slider legs 118, 120, 122, 124 and the slider receivers 86, 88, 90, 92.

Additionally, where the sprayer 10 features the tread width adjustment feature, each of the slider receivers 86, 88, 90, 92 may include grease fittings configured to allow for insertion of grease into the slider receivers 86, 88, 90, 92 to further reduce the amount of friction between the various components including the slider receivers 86, 88, 90, 92 and the respective axle slider legs 118, 120, 122, 124. For instance, a first grease fitting 174 may be formed in the top wall 80 of the cross members 72, 74 and a second grease fitting (not shown) may be formed in a bottom wall 82 of the cross member 72, 74. Looking to FIG. 9, although the top grease fitting 174 is only shown relative to the third slider receiver 90, similar grease fittings are used with the remaining slider receivers 86, 88, 92. Where the sprayer 10 does not feature the tread width adjustment feature, grease fittings need not be included, but nevertheless the slider to frame connection 162 may facilitate the installation of the first axle slider assembly 114 relative to the first side 50 about the first slider receiver 86 and the third slider receiver 90 and the second axle slider assembly 116 relative to the second side 52 about the second slider receiver 88 and the fourth slider receiver 92.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A high clearance sprayer with adjustable track width and a slider to frame connection arrangement, the high clearance sprayer comprising:
   a frame with left and right sides and a pair of cross members extending transversely between the left and right sides with outer segments of the first and second cross members defining:
      a pair of left slider receivers toward the left side of the frame, with each of the left slider receivers having:
         a first generally tubular body defined by interconnected slider receiver walls with inwardly facing surfaces;
      a pair of right slider receivers toward the right side of the frame, with each of the right slider receivers having:
         a second generally tubular body defined by interconnected slider receiver walls with inwardly facing surfaces;
   a left axle slider that extends outwardly and beyond the left side of the frame to support a pair of left wheels of the high clearance sprayer, the left axle slider including:
      a left main slider body;
      a pair of left slider legs, each of the left slider legs having interconnected slider leg walls with outwardly facing surfaces wherein at least one of the outwardly facing surfaces of each of the left slider legs including a recess therein;
   a right axle slider that extends outwardly and beyond the right side of the frame to support a pair of right wheels of the high clearance sprayer, the right axle slider including:
      a right main slider body;
      a pair of right slider legs, each of the right slider legs having interconnected slider leg walls with outwardly facing surfaces wherein at least one of the outwardly facing surfaces of each of the right slider legs including a recess therein; and
   a slider to frame connection arrangement defined between the left and right slider receivers and the left and right axle sliders, wherein the slider to frame connection arrangement includes:
      a reduced friction zone defined at outer ends of each of the pairs of left and right slider receivers to facilitate telescopic movement of the respective pairs of the left and right slider legs inside of the pairs of left and right slider receivers;
      at least one fixed slider wear pad arranged in a fixed position within the reduced friction zone; and
      at least one movable slider wear pad mounted in the recess in the at least one of the outwardly facing surfaces of each of the left slider legs and in the recess in the at least one of the outwardly facing surfaces of each of the right slider legs and being movably arranged within the reduced friction zones so that each of the at least one movable slider wear pad moves within the reduced friction zones during the telescopic movement of the respective pairs of the left and right slider legs inside of the pairs of left and right slider receivers.

2. The high clearance sprayer of claim 1, wherein the at least one fixed slider wear pad defines a slider receiver wear pad that is mounted to at least one of the inwardly facing surfaces of the slider receiver walls.

3. The high clearance sprayer of claim 1, wherein the at least one fixed slider wear pad defines a pair of slider receiver wear pads that are mounted to a pair of the inwardly facing surfaces of the slider receiver walls.

4. The high clearance sprayer of claim 3, wherein the pair of slider receiver wear pads is mounted to a pair of oppositely facing surfaces of the inwardly facing surfaces of the slider receiver walls.

5. The high clearance sprayer of claim 4, wherein the pair of slider receiver wear pads is mounted to inwardly facing surfaces of the slider receiver walls that define a top wall and a bottom wall of the slider receiver walls.

6. The high clearance sprayer of claim 1, wherein the at least one movable slider wear pad is defined by a pair of slider leg wear pads that are mounted to a pair of the outwardly facing surfaces of the slider leg walls so that the slider leg wear pads move in unison with the respective slider legs.

7. The high clearance sprayer of claim 6, wherein on each of the left and right axle sliders, the pair of slider leg wear pads includes a first slider leg wear pad mounted to a first slider leg and a second slider leg wear pad mounted to a second slider leg.

8. The high clearance sprayer of claim 7, wherein the first and second slider leg wear pads face away from each other with the first slider leg wear pad mounted to a forward-facing surface of the first slider leg and the second slider leg wear pad is mounted to a rearward-facing surface of the second slider leg.

9. A high clearance sprayer with adjustable track width and a slider to frame connection arrangement, the sprayer comprising:
   a frame comprising:
      a left side;
      a right side;
      a first cross member extending between the left side and the right side;
      a second cross member extending between the left side and the right side;
   a left axle slider movable relative to the left side, the left axle slide having an outwardly facing surface including a recess therein;
   a right axle slider movable relative to the right side; the right axle slide having an outwardly facing surface including a recess therein; and
   a slider to frame connection arrangement defined between the left axle slider, the right axle slider, the first cross member, and the second cross member, wherein the slider to frame connection arrangement includes:
      a reduced friction zone defined at outer ends of the first cross member and the second cross member to facilitate telescopic movement of the left axle slider and the right axle slider inside the first cross member and the second cross member;
at least one fixed slider wear pad arranged in a fixed position within the reduced friction zone; and
at least one movable slider wear pad mounted in the recess in the outwardly facing surface of the left axle slider and the outwardly facing surface of the right axle slider and being movably arranged within the reduced friction zones.

10. The high clearance sprayer of claim 9, wherein the first cross member has a first slider receiver on the left side and a second slider receiver on the right side,
wherein the second cross member has a third slider receiver on the left side and a fourth slider receiver on the right side;
wherein the left axle slider comprises:
a first axle slider leg configured to be telescopically inserted into the first slider receiver;
a second axle slider leg configured to be telescopically inserted into the third slider receiver;
wherein the right axle slider comprises:
a third axle slider leg configured to be telescopically inserted into the second slider receiver;
a fourth axle slider leg configured to be telescopically inserted into the fourth slider receiver.

11. The high clearance sprayer of claim 10, wherein the at least one fixed slider wear pad defines a pair of slider wear pads mounted to an inwardly facing opposite surface of the first cross member.

12. The high clearance sprayer of claim 11, wherein the pair of slider wear pads are mounted a top surface and a bottom surface of the first cross member.

13. The high clearance sprayer of claim 10, wherein each of the first slider receiver, the second slider receiver, the third slider receiver, and the fourth slider receiver has a first grease fitting formed in a top wall and a second grease fitting formed in a bottom wall.

14. The high clearance sprayer of claim 10, wherein the at least one movable slider wear pad defines a pair of slider wear pads mounted to the first axle slider leg and the second axle slider leg.

15. The high clearance sprayer of claim 10, wherein the at least one movable slider wear pad has a substantially larger surface area than the surface area of the at least one fixed slider wear pad.

16. The high clearance sprayer of claim 10, wherein the slider pads are made of an ultra-high molecular weight material.

17. A high clearance sprayer with adjustable track width and a slider to frame connection arrangement, the sprayer comprising:
a frame comprising:
a left side;
a right side;
a first cross member extending between the left side and the right side; and
a second cross member extending between the left side and the right side;
a left axle slider movable relative to the left side;
a right axle slider movable relative to the right side; and
a slider to frame connection arrangement defined between the left axle slider, the right axle slider, the first cross member, and the second cross member, wherein the slider to frame connection arrangement includes:
a reduced friction zone defined at outer ends of the first cross member and the second cross member to facilitate telescopic movement of the left axle slider and the right axle slider inside the first cross member and the second cross member;
at least one fixed slider wear pad arranged in a fixed position within the reduced friction zone; and
at least one movable slider wear pad movably arranged within the reduced friction zone;
wherein:
the first cross member has a first slider receiver on the left side and a second slider receiver on the right side;
the second cross member has a third slider receiver on the left side and a fourth slider receiver on the right side;
the left axle slider comprises:
a first axle slider lea configured to be telescopically inserted into the first slider receiver; and
a second axle slider leg configured to be telescopically inserted into the third slider receiver;
the right axle slider comprises:
a third axle slider leg configured to be telescopically inserted into the second slider receiver; and
a fourth axle slider leg configured to be telescopically inserted into the fourth slider receiver;
each of the first axle slider leg, second axle slider leg, third axle slider leg, and fourth axle slider leg further comprises:
a top plate with an outwardly facing first edge;
a bottom plate with an outwardly facing second edge; and
a side plate extending between the top plate the bottom plate;
the side plate is offset from the first edge and the second edge to form a lip; and
the at least one movable slider wear pad is secured within the lip.

18. A high clearance sprayer comprising:
a frame comprising:
a first cross member with a first slider receiver on a first side and a second slider receiver on a second side, and
a second cross member with a third slider receiver on the first side and a fourth slider receiver on the second side;
a first tread width connector comprising:
a first axle slider leg configured to be telescopically inserted into the first slider receiver;
a second axle slider leg configured to be telescopically inserted into the third slider receiver;
a second tread width connector comprising:
a third axle slider leg configured to be telescopically inserted into the second slider receiver;
a fourth axle slider leg configured to be telescopically inserted into the fourth slider receiver;
a plurality of horizontal fixed slider wear pads to minimize friction between the first axle slider leg, the second axle slider leg, the third axle slider leg, and the fourth axle slider leg and the first slider receiver, the second slider receiver, the third slider receiver and the fourth slider receiver, respectively; and
a plurality of vertical slider movable wear pads seated in recesses in outer surfaces of the first axle slider leg, the second axle slider leg, the third axle slider leg, and the fourth axle slider leg and configured to minimize friction between the first axle slider leg, the second axle slider leg, the third axle slider leg, and the fourth axle slider leg and the first slider receiver, the second slider receiver, the third slider receiver and the fourth slider receiver, respectively.

19. The high clearance sprayer of claim 18, wherein each of the first slider receiver, the second slider receiver, the third slider receiver, and the fourth slider receiver has a first grease fitting formed in a top wall and a second grease fitting formed in a bottom wall.

\* \* \* \* \*